United States Patent [19]
Scharmer

[11] Patent Number: 5,640,577
[45] Date of Patent: Jun. 17, 1997

[54] DATA PROCESSING SYSTEM WITH AUTOMATED AT LEAST PARTIAL FORMS COMPLETION

[75] Inventor: Andrew J. Scharmer, Tewksbury, Mass.

[73] Assignee: Davox Corporation, Westford, Mass.

[21] Appl. No.: 517,803

[22] Filed: Aug. 22, 1995

Related U.S. Application Data

[63] Continuation of Ser. No. 816,018, Dec. 30, 1991, abandoned.

[51] Int. Cl.⁶ ................................................. G06F 17/30
[52] U.S. Cl. ......................... 395/768; 395/347; 395/615; 395/769
[58] Field of Search .......................... 395/145, 148, 395/149, 600, 347, 615, 768, 769

[56] References Cited

U.S. PATENT DOCUMENTS

| | | | |
|---|---|---|---|
| 4,553,206 | 11/1985 | Smutek et al. ........................ | 395/275 |
| 4,763,356 | 8/1988 | Day, Jr. et al. ...................... | 395/149 |
| 4,829,294 | 5/1989 | Iwami et al. ........................ | 395/146 |
| 4,962,475 | 10/1990 | Hernandez et al. .................. | 395/146 |
| 5,251,291 | 10/1993 | Malcolm ............................ | 395/146 |

*Primary Examiner*—John C. Loomis
*Attorney, Agent, or Firm*—Daniel J. Bourque; Kevin J. Carroll

[57] ABSTRACT

A data processing system including automated forms generation uses data displayed at a predetermined position on a data terminal display screen and a data processing function selector, to automatically retrieve a pre-established form stored in a data processing system. In one embodiment, the form includes a number of uncompleted fields. The data processing system retrieves at least one datum from at least one data field displayed on the screen, and automatically inserts the data in a predetermined uncompleted field of the form. The partially or fully completed form is then stored for later retrieval, updating and printing by the data processing system.

21 Claims, 6 Drawing Sheets

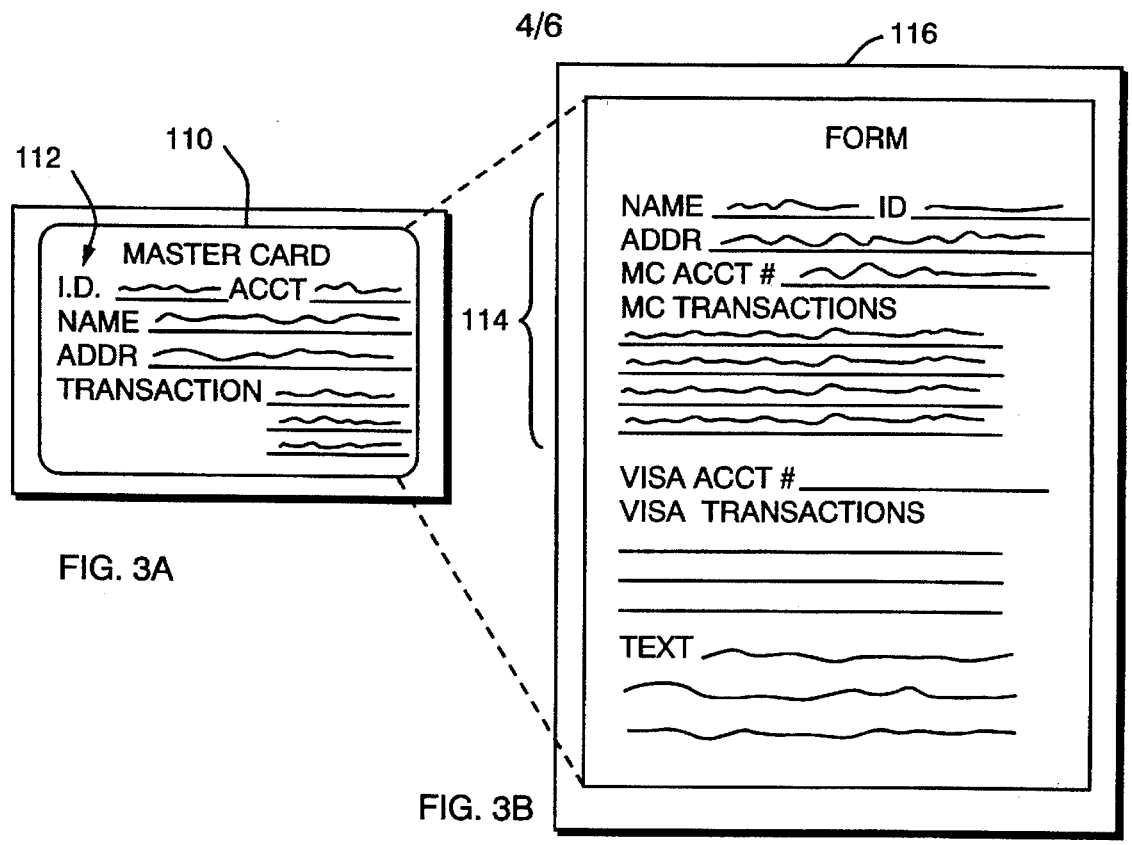
FIG. 3A
FIG. 3B
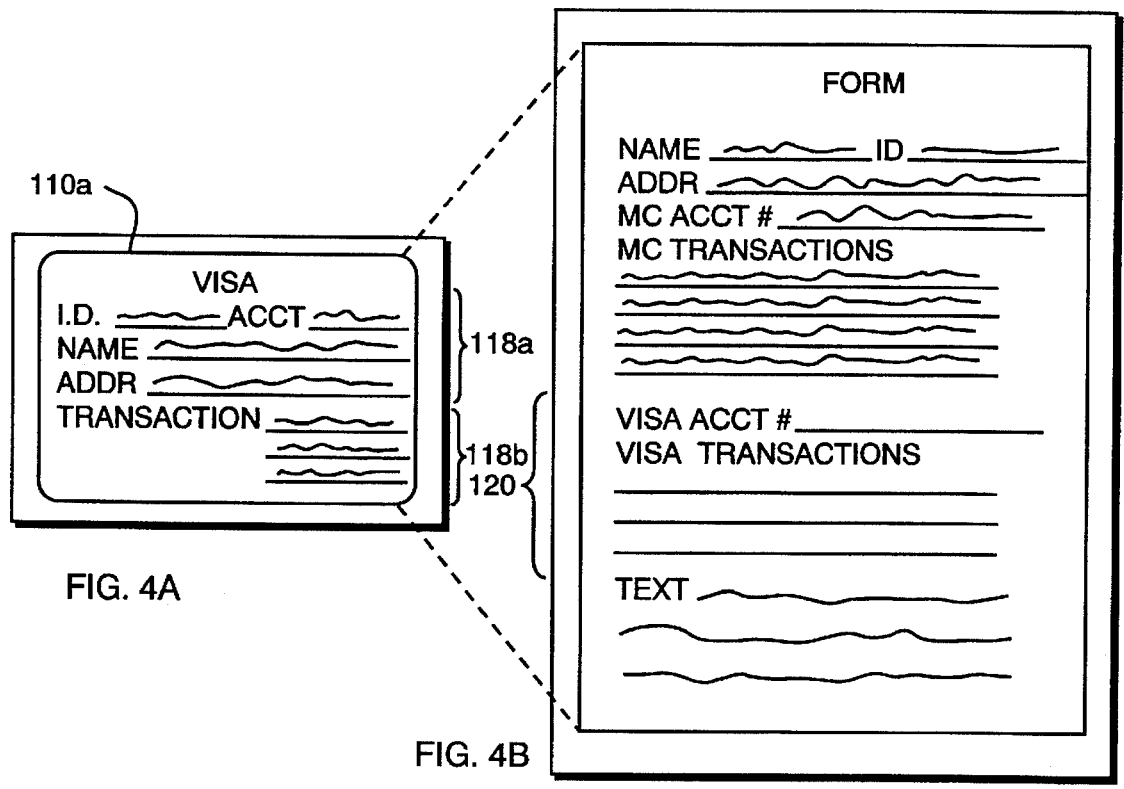
FIG. 4A
FIG. 4B

TELEMARKETING OUTBOUND SCRIPT     150

HELLO MR. MRS. MS. _____NAME FILLED IN_____ MY NAME IS_____ AND I AM CALLING ABOUT _ _ _ _ _ _ _ _ _

_____

_____

_____

_____

_____ _ _ _ _ _ _ ?

YES           NO
   ($SB_A$)       ($SB_B$)

| OLDPRO WINDOW AND STORM DOOR COMPANY TELEPHONE CONTACT FORM |
|---|
| CUSTOMER NAME: ................... PHONE NUMBER: ............... |
| ADDRESS: ................. CITY: ............... ST: ......... |
| RESULTS: NEED REPLACEMENT WINDOWS OR DOORS? YES: NO: |
|          HAVE SALESPERSON CONTACT? YES: NO: |
|          BEST TO HAVE SALES PERSON CALL? DAY/S ........ TIME ........ |
|          SEND LITERATURE? YES • NO • |
| TSR: ............ DATE: ............. TIME: ......... RATING: ......... |
| SALESPERSON ASSIGNED: ............................ DATE: ......... |

DATA PROCESSING SYSTEM WITH AUTOMATED AT LEAST PARTIAL FORMS COMPLETION

This application is a continuation of application Ser. No. 07/816,018, filed Dec. 30, 1991, and now abandoned.

This invention relates to data processing systems and more particularly, to a system which automatically retrieves, completes, stores and prints forms or letters.

BACKGROUND OF THE INVENTION

Many users of data processing systems are often required to fill or send out forms or letters during or after one or more data processing transactions. For example, a bank service division handling credit card operations will handle tasks such as credit card security, including spotting fraudulently used or stolen credit cards, customer reports of lost or stolen credit cards, customer inquiries regarding such credit cards, and replacement card requests.

Such an operation relies heavily on forms and letters and in some cases, up to several dozen forms may have to be filled out. Such forms may include initial customer set up check lists, customer, merchant and law enforcement follow-up forms, and even Western Union mailgrams to be sent to a customer.

In the prior art, such forms are typically filled out manually and placed in a file folder. Little information is available on-line on the data processing system. All follow-up action on a particular case requires access to this file. Locating the file is often a problem leading to time lost and wasted in searching for the file. Additionally, a manual file system may also result in incomplete files due to forms not being placed in the file, or forms improperly or incompletely filled out.

In another prior art system, although a form can be partially completed using data displayed on a data terminal screen, the form cannot be saved and must be immediately printed or viewed. The form cannot be saved for later retrieval either by another operator or service representative, or by the same service representative wishing to complete or add more information to the partially completed form.

Other inefficiencies in the prior art method result from a lack of simultaneous operator terminal access to multiple data processing applications. For example, in processing a customer's call, a service representative may be required to log into many different application programs and routinely access an even greater number of screens of information. Such a system requires the service representative to manually or automatically record on a form or other piece of paper, one or more pieces of information from each terminal screen, after which all information must be manually entered onto one form.

Further, such a system then requires the service representative to log off one application program before logging on to another. This necessitates re-entry of the customer's account number and supporting identification codes with each access to a different applications program or host. Such a method is extremely time consuming, further ties up the host computer resources, and often results in numerous data entry errors. This further results in delays in processing the customer cases and an accompanying tendency to act on incomplete or improperly compiled information.

SUMMARY OF THE INVENTION

Accordingly, the present invention provides the user of a data processing system with forms or other documents which are automatically at least partially completed or filled in with data presented on an operator's data terminal screen. Additionally, the present invention provides the capability of temporarily storing or saving a partially completed or fully completed form or document ("live form") for later retrieval. A partially completed form or document may be retrieved at a later time by the same operator which initially completed the form or by a different operator, and further merged with data from a second or subsequent operator data terminal screen to more fully or completely fill out the form or document. Subsequently, the completed form or document may be stored on-line for future use and printing as required.

Thus, the present invention includes a data processing system which supports at least one computer applications program accessing at least one database. The data processing system also includes at least one operator terminal including a data terminal display screen and a plurality of data processing function selectors. The operator terminal is responsive to the selection of at least one of the data processing function selectors, for initiating at least one computer applications program to access at least one database. The operator terminal further displays on the data terminal display screen at least one computer session which includes the display of a plurality of data fields displayed at a corresponding plurality of predetermined data terminal display screen coordinate positions. In the preferred embodiment, the data processing function selectors include predetermined keyboard keys and a telephone receiver.

The data processing system stores at least one previously entered form for use by the operator terminal. Also included is a forms manager and coordinator which is responsive to at least a first one of the data processing function selectors and to at least one datum displayed in a data field at a predetermined data terminal screen coordinate position, for retrieving a predetermined form and displaying the form on the data terminal screen of the operator terminal.

The preferred embodiment includes one or more host systems, each host system including a plurality of application programs accessing a plurality of databases. Also included in the preferred embodiment is an intelligent resource server, which is coupled between the one or more host systems and one or more operator terminals, for controlling communications between the operator terminals and the host system.

In the preferred embodiment, the intelligent resource server includes the number of previously completed forms. At least one of the forms includes a number of uncompleted fields. Further, the forms manager and coordinator is responsive to a first selected data processing function selector and to at least one datum displayed in at least one data field at a predetermined coordinate position on the operator terminal, for retrieving a predetermined form, for inserting at least one datum previously displayed on the operator terminal display screen into an uncompleted field in the form, and for saving the at least partially completed form.

The data processing system with automated forms generation of the present invention is also responsive to at least a second data processing data function selector, for initiating a second applications program accessing a second database in response to data displayed at a predetermined data terminal screen coordinate position in a form, and for retrieving either the first previously save and partially completed form, or a second predetermined and predefined form.

In the preferred embodiment, each host system is operable for simultaneously running a plurality of application programs accessing a plurality of databases, and the operator terminals are operative for simultaneously displaying a plurality of computer sessions.

DESCRIPTION OF THE DRAWINGS

These, and other features and advantages of the present invention will be better understood by reading the following detailed description, taken together with the drawings wherein:

FIGS. 3A, 3B and 4A, 4B illustrate the selective transfer of data between operator terminals displaying a computer session and a form, according to one feature of the present invention;

FIG. 5 is a representation of a telemarketing script form according to another feature of the present invention; and FIG. 6 is a representation of an uncompleted form according to yet another feature of the present invention.

DETAILED DESCRIPTION OF THE INVENTION

Figure 1:
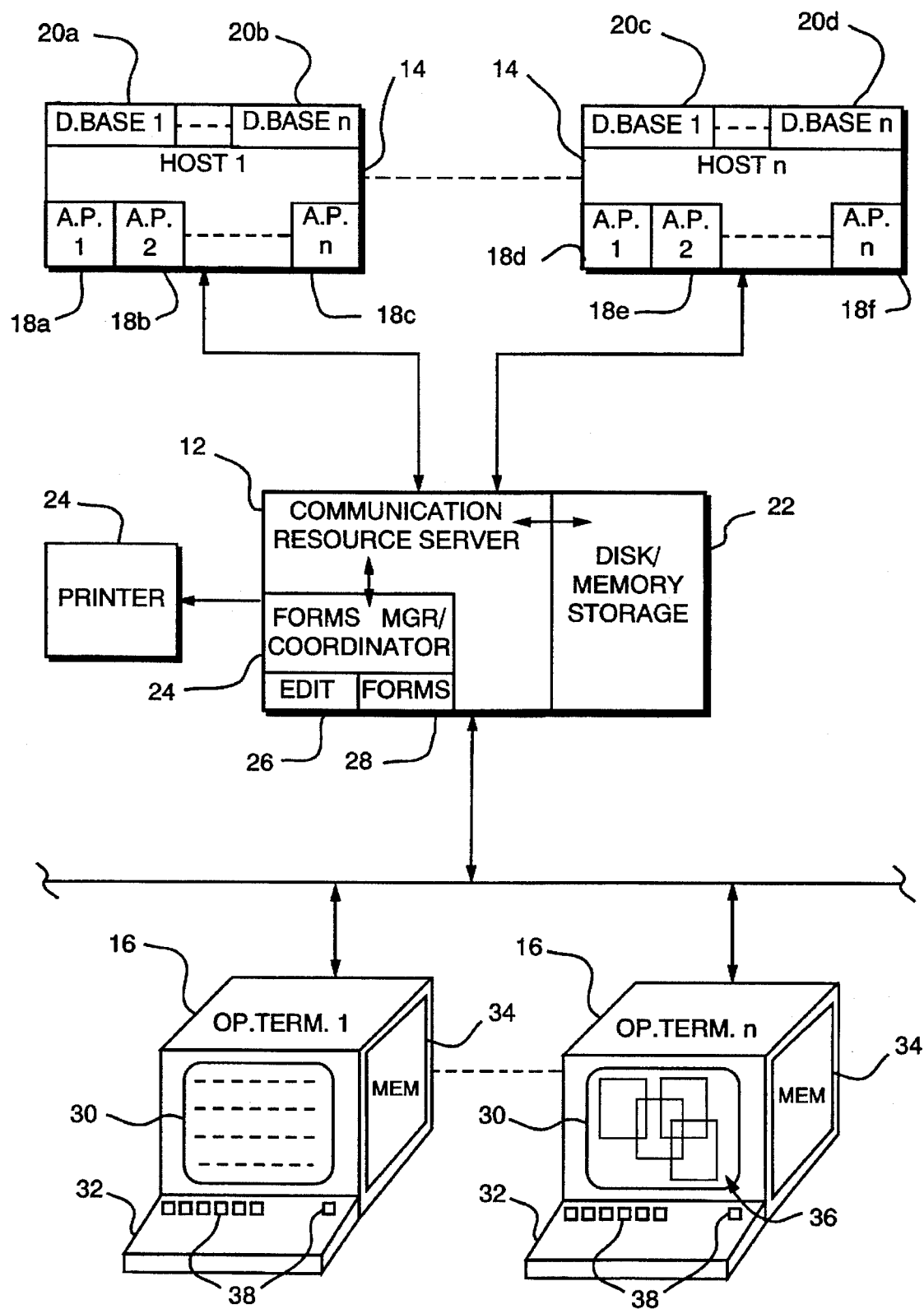
FIG. 1 is a schematic diagram of a preferred embodiment of a data processing system including the automated forms generation according to the present invention.

A data processing system incorporating automated forms generation according to the present invention is shown in a preferred system embodiment 10, FIG. 1, and includes an intelligent resource server 12 which serves as a data communications controller between one or more host systems 14 and one or more operator terminals 16.

Each host 14 includes a standard computer system such as an IBM mainframe, or equivalent, capable of running one or more application programs 18a–18f. The application programs in turn, access one or more databases, such as databases 20a–20d, on the respective host.

In the preferred embodiment, the intelligent resource server 12 is capable of maintaining multiple, simultaneous active computer sessions with a plurality of synchronous and asynchronous data sources, typically host systems. The intelligent resource server 12 also supports additional features such as logical unit pooling. The intelligent resource server 12 includes, or is coupled to a disk and/or memory storage device 22 as well as to printer 24. An exemplary intelligent resource server is the Communication Resource Server™ (CRS™) available from DAVOX Corporation, Billerica, Mass.

According to the preferred embodiment of the present invention, the intelligent resource server includes a forms manager/coordinator 24 which in the preferred embodiment, incorporates at least a text editor 26 for generating and storing a number of blank forms 28.

The exemplary data processing system with automated forms generation according to the present invention includes one or more operator terminals 16, each of which include a display screen 30 and keyboard 32. The terminal may further include data storage (memory) 34 and data processing means (not shown) as is well known in the art. In addition, data terminals 16 may comprise enhanced workstations which include other data reception and transmission devices such as, for example, a telephone handset (not shown) and the ability to simultaneously display multiple active computer sessions as shown at 36. An example of such an enhanced workstation is the DAVOX 5900 workstation which integrates a video terminal, programmable keyboard, and telephone handset into one unit, and is available from DAVOX Corporation, Billerica, Mass.

Each of the data terminals 16 in the preferred embodiment include one or more user definable function selectors. Each user definable function selector allows the user (or the system manager) to specify one or more tasks to be performed or initiated upon the selection of the user definable function selector. Examples of user definable function selectors include programmable data terminal keyboard keys 38 (Smart Button™s, trademark of DAVOX Corporation) or a telephone handset (not shown). User definable tasks or functionalities associated with a Smart Button™ or other user definable function selector include user definable mathematical functions, transmitting data to a host, notifying a supervisor of operator availability and statistical data gathering. Such programmable function selectors are also described in copending U.S. applications Nos. 07/532,453, 07/798,239, 07/798,241, assigned to the assignee of the present invention and incorporated herein by reference.

Before being invoked or executed, the user definable function selectors must be defined, typically by the system manager/administrator by utilizing a text editor to define the commands to be invoked or initiated when the assigned Smart Button™ or other function selector is selected. Such editing is typically performed on a data terminal such as terminal 16 or other equivalent device such as a personal computer, coupled to the communication resource server. Typically, the user definable function selector assignments are stored in the intelligent resource server 12 in disk/memory storage unit 22, and are downloaded to one or more operator terminals 16 when an operator logs onto the system. Thus, each operator may have his or her own set of Smart Button™ keys or other user definable function selectors.

Prior to utilizing the data processing system with automated forms generation according to the present invention, the system administrator/manager utilizes the editor function 26 of the forms manager/coordinator 24 to generate and store one or more blank forms, illustrated by forms box 28. Such an editor includes any conventional text or graphics editor which allows the user to generate text or graphics to be displayed on an operator terminal screen. The present invention contemplates that forms may include display screens with incomplete or missing information, mere textual information such as forms or procedures outlines or manuals, or combinations of both.

In order to utilize the data processing system with automated forms generation of the present invention, the preferred embodiment contemplates that the system administrator/manager first define one or more Smart Button™ keys which will serve to manage and control the merging of data with a form, the saving and retrieving of a form, and the display of a form on an operator terminal screen.

An example of a user definable function selector or Smart Button™ command sequence is illustrated in Table I reproduced below.

TABLE I

| 1. | Save 85 (R, C, L) | (Name) |
|----|-------------------|--------|
| 2. | Save 84 (R, C, L) | (Address) |
| 3. | Save 83 (R, C, L) | (Transaction History) |
|    | —                 |        |
|    | —                 |        |
|    | —                 |        |
| 4. | Retrieve Form X   |        |

TABLE I-continued

| 5. | Retrieve 85 (R, C) |
| 6. | Retrieve 84 (R, C) |
| 7. | Retrieve 83 (R, C) |

We will assume, for this example, that a data processing system is being utilized to retrieve information about a client from a host system. Such information may include credit card or other loan information.

Figure 2A:
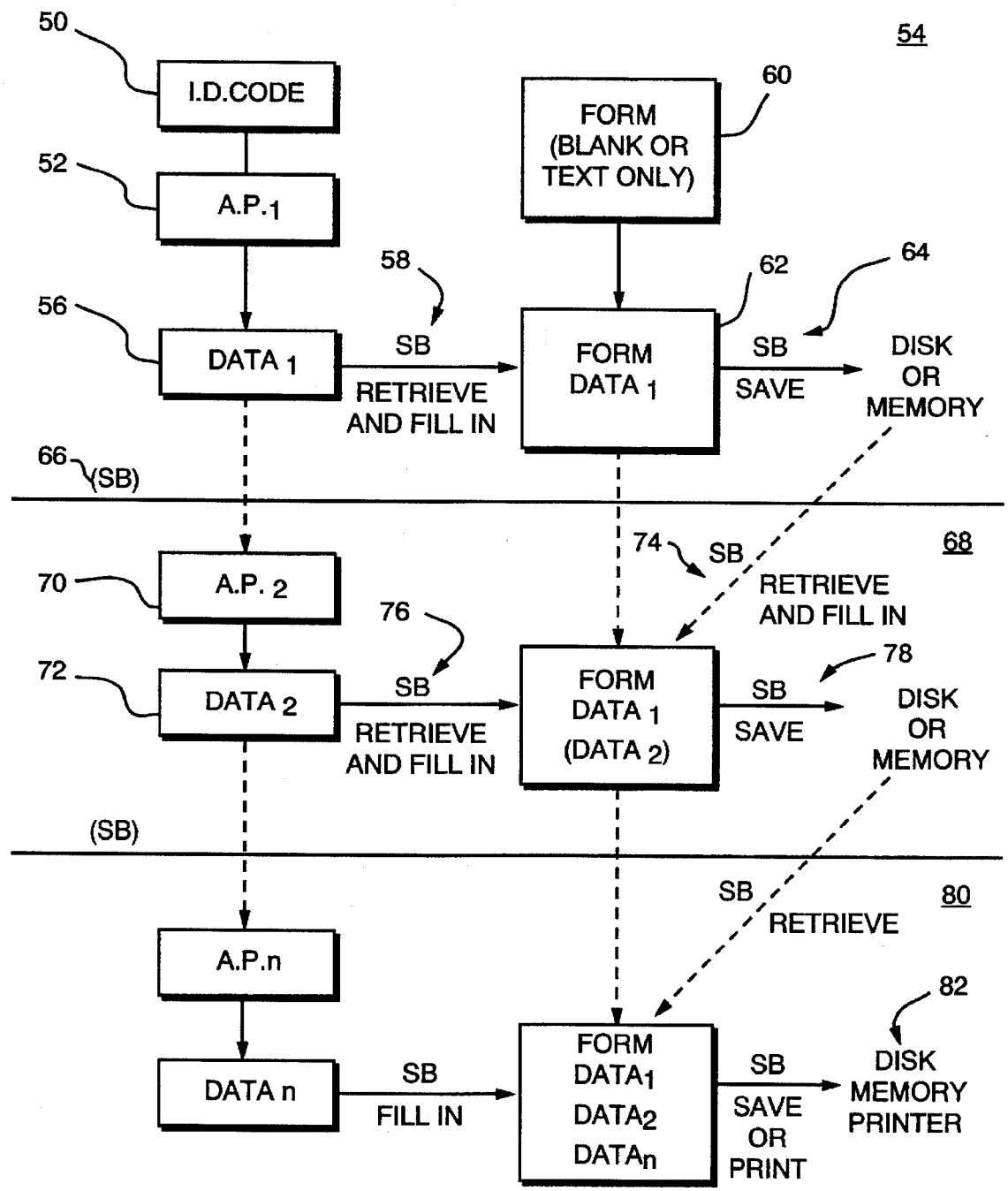
FIGS. 2A and 2B are flowcharts illustrating the automated flow of data between computer sessions and one or more forms, according to the present invention.

As shown in FIG. 2A, an operator first enters a client I.D. code 50 from which the application program 52 retrieves and displays for this first computer session 54, a screen of data 56. Depressing or selecting a Smart Button™ or user definable function selector 58 programmed according to Table I, causes a blank or text only form 60 to be retrieved and filled in (in the case of a form containing blanks) and displayed on the operator terminal screen.

For exemplary purposes, depressing a Smart Button™ 58, operates as follows: As shown in line 1 of Table I, the data displayed on the screen at the indicated row (R) and column (C) coordinates of the data terminal display screen, and having a predetermined length (L) are stored in one or more data terminal memory locations identified as location 85. In reality, the value displayed on the data terminal display screen will be copied from the data terminal memory location(s) in which the data is stored when being displayed on the screen, to the location(s) indicated by the R and C designation. For this example, such data might represent the name of the client or customer.

Similarly, lines 2 and 3 of Table I specify that the address and transaction history respectively, which are displayed on the screen at the associated row (R) and column (C) with a predetermined length (L) are stored in the data terminal memory locations 84 and 83 respectively. Any amount or type of data in one or more data fields displayed on the operator terminal display screen may be likewise identified by row, column and length, and stored to a predetermined data terminal memory location.

After all the desired data has been stored to memory, the user definable function selector next retrieves, from the intelligent resource server, a predetermined form identified by name or number, as shown in line 4 of Table I. The step of retrieving a predetermined form will rewrite the operator terminal display screen, thus displaying the form to the operator.

Subsequently, the steps indicated in lines 5, 6 and 7 of Table I illustrate how the forms manager retrieves from the specified operator terminal memory location, the data contained in that memory location, and displays the data on the screen at the data terminal screen coordinate positions indicated by the row (R) and column (C) designations. Thus, in effect, the user definable function selector command sequence "fills in" the previously blank form. Subsequently, another Smart Button™ which has been previously defined to save the form is depressed or selected, thus saving the now partially or fully completed form to disk or memory, as shown at 64.

After the first at least partially completed form has been saved to disk or memory, another Smart Button™ or other function selector 66 which has also been previously defined, may be utilized to use data either previously stored in memory or displayed on the data terminal screen, such as the customer ID Code, to invoke a second computer session 68 thus starting a second applications program 70 to retrieve a second screen of data 72 without the operator having to re-enter the client's identification code. One or more Smart Button™ function selectors may then be utilized to retrieve from memory and further fill in the first partially completed form, 74, or retrieve a new form to fill in, 76. A user definable function selector is then utilized to save to disk or memory the second form, or the more fully completed first form, 78. The described steps and procedures may be repeated for one or more additional computer sessions 80, until finally, it is desired to print the form, 82.

It is understood that from any one data screen, one or more forms may be partially or fully completed by utilizing one or more Smart Button™ function selectors or other user definable function selectors to alternate between the display of a data screen and retrieving, filling in and saving of a form. In addition, it is also understood that a form may be filled in by an operator by positioning the cursor at the desired location on the screen and entering the information. Such information gets stored in the operator terminal memory for subsequent saving with the form.

Figure 2B:
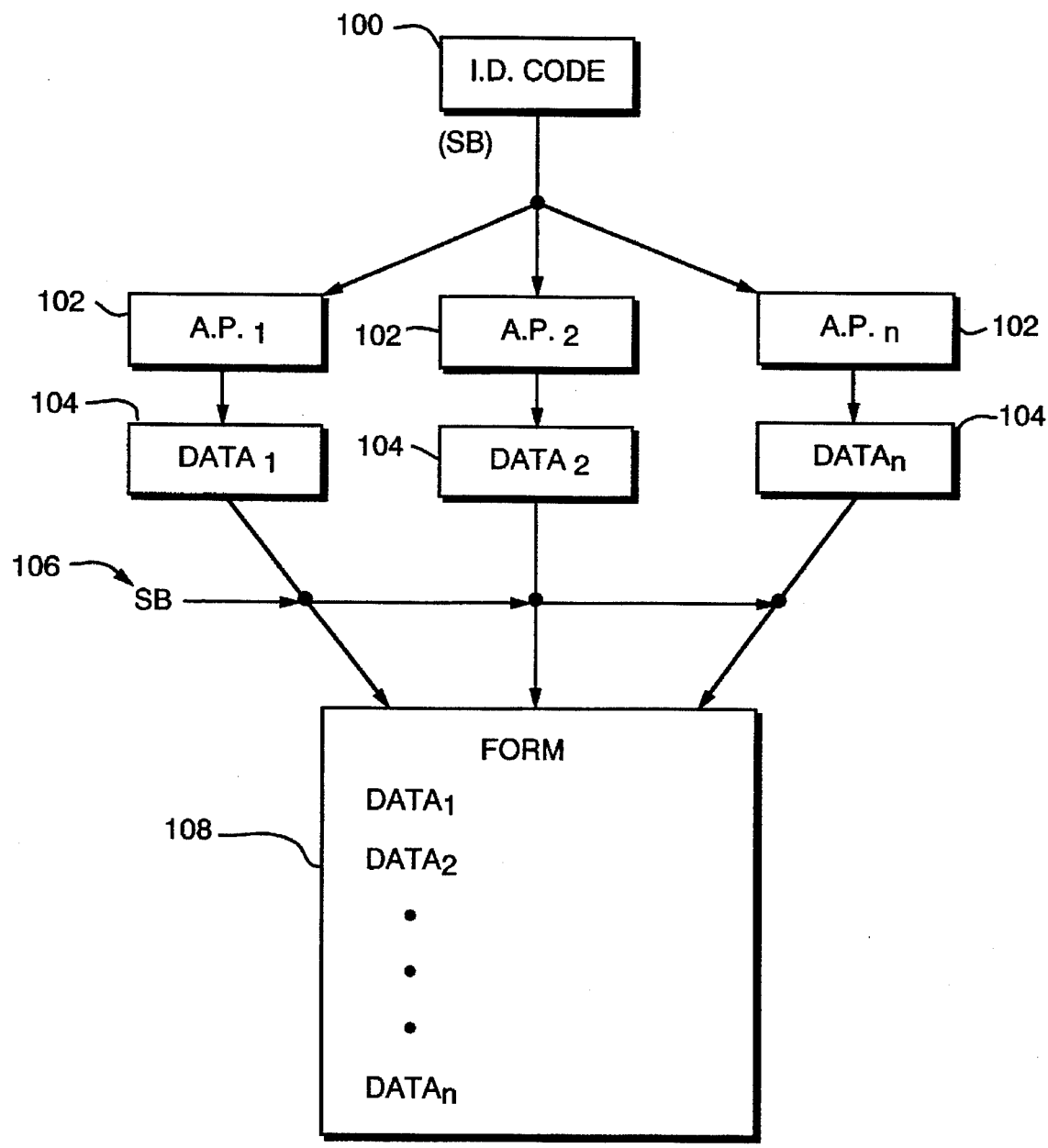

In addition to sequential execution of application programs as described in conjunction with FIG. 2A, one embodiment of the present invention also includes a data processing system with automated forms generation wherein the system is capable of supporting simultaneous, multiple computer sessions. As shown in FIG. 2B, entry of an identification code or other unique client identifier 100, with or without the aid of a user definable function selector, invokes multiple application programs 102 providing multiple screens of data 104, typically displayed in a windowed manner or environment. By subsequently depressing one or more user definable function selectors and sequencing through the "windowed" data screens, 106, one or more forms with multiple data may be completed, 108.

A more detailed example of data from a data terminal screen, utilized to at least partially fill in a form is shown in FIGS. 3A, 3B and 4A, 4B. In FIG. 3A, data terminal screen displays the result of a first computer session 110, wherein an application program has retrieved Master Card account information concerning a customer, based upon an identification code or other identifying data entered by an operator. Utilizing a Smart Button™ function selector as previously described, a first set of data, in this case Master Card account, transaction, and customer name and address information 114, may be transferred to form 116 which has been called up from the intelligent resource server.

As shown in FIG. 4A, a second application program displays a second computer session 110a on the data terminal screen wherein a second group of information such as, for example, Visa Card account number, transaction history, etc., is displayed as shown at 118a and 118b, and subsequently transferred to the form as shown at location 120. It should be noted that in the display of the second computer session 110a, the applications program which controls the display of information has displayed the customer's I.D. and account number at a different location on the operator's data terminal screen than in the previous computer session display 110, FIG. 3A. In addition, date or other information may have been added or even omitted. Thus, an operator need not concern himself or herself with finding information on the screen but rather, access to a particular applications program utilizing a user definable function selector such as a Smart Button™ which has been programmed to automatically retrieve the appropriate information from the predefined location on the data terminal screen, will cause the forms manager to fill in that information on the preselected form.

Accordingly, an operator wishing to view a customer's information or file need not be concerned with searching for the information on the data terminal display screen but rather, may call up the client's form which has been previously filled in and saved, and read the information from the form. This results in enhanced operator efficiency in not having to search for and find information on the data terminal display screen which may be displayed at a different location as the operator switches from one applications program to another. In addition, data processing resources are also saved in that an operator need not initiate another applications program which uses valuable host time but rather, need only call up the client's form stored in the intelligent resource server to have access to all the pertinent information about the client's transaction.

Thus, if a customer has more than one credit card, bank account, or other information file of interest, an operator may page through the various data screens presented by one or more application programs, and automatically fill in a form to be stored for later use, mailed to the customer, or otherwise stored or printed. Alternatively, a used programmable function selector may be defined which automatically accomplishes this task without the need for the operator to view the various screens of data.

An example of an additional feature of the data processing system with automated forms generation of the present invention is shown in FIG. 5 wherein form 150 is a telemarketing outbound script which is displayed on an operator's data terminal screen. In this example, such an outbound script may be automatically displayed when an incoming voice signal (telephone call) is present at the operator's terminal. Thus, in this example, the detection of a call ringing at the operator terminal, or the act of picking up the telephone handset at the operator terminal serves as the user definable programmable function selector which has been programmed to retrieve the appropriate, predetermined form.

Accordingly, in this example, the operator will read the script in which the name of the called party has been filled in from the database which contains the party's telephone number and associated name. After reading the prepared script, the operator will typically ask a question requiring a yes or no answer. Based upon the answer, the operator will depress one of two Smart Button™ function selectors.

If, for example, the called party responds no, depressing the Smart Button™ function selector "B" may place an indicator in the name/telephone database that this party should not be called again. If, however, the called party answers yes, Smart Button™ function selector "A" will be depressed by the operator, which will in turn retrieve form 160, FIG. 6.

As shown in form 160, retrieving the form merges or fills in the customer name, phone number and address, and a yes answer to the question "Need replacement windows or doors" based upon the answer received and Smart Button™ depressed during display of previous form 150. Accordingly, the second or subsequent form will prompt the operator to ask and enter into the form the answer to the questions which follow such as should a sales person contact the customer and if so, at what time, and whether additionally or even alternatively, should only literature be sent.

Prior to saving the form, the operator (service representative) name or initials, the current date, and time will then be entered in the form. The form is then saved, along with other similar forms, for which a salesperson must be later assigned. For exemplary purposes, salesperson assignment may be performed by a sales manager, operator supervisor, or other person at a later time and date. Such a person need therefore only deal with a file containing forms for which a salesperson must be assigned and need not re-display or re-initiate a host session.

Alternatively, a no answer to the "have salesperson contact?" answer can be checked by a task programmed to a Smart Button™ function selector, and the form saved to a file, which along with other similar forms, do not need subsequent salesperson follow-up. Such a file might be utilized to generate a list of names and telephone numbers for subsequent follow-up telephone contact after a predetermined period of time.

Modifications and substitutions by one of ordinary skill in the art are considered to be within the scope of the present invention which is not to be limited except by the claims which follow.

I claim:

1. A data processing system including a dynamic forms manager and coordinator, comprising:

a plurality of host systems, each of said host systems including a plurality of application programs and a plurality of databases, said plurality of databases including client data;

a plurality of operator terminals, each of said plurality of operator terminals including at least a data terminal display screen and a plurality of programable data processing function selectors, each of said plurality of operator terminals responsive to the selection of at least one of said plurality of programable data processing function selectors, for initiating a plurality of computer application programs to access said plurality of databases containing client data, and for simultaneously displaying on said data terminal display screen a plurality of computer sessions, each display of each of said plurality of computer sessions including the display of a plurality of data fields containing client data from said plurality of databases, said plurality of data fields displayed at a corresponding plurality of predetermined data terminal display screen coordinate positions;

said data processing system further including a resource server, coupled between said plurality of host systems and said plurality of operator terminals, for controlling communications between each of said plurality of operator terminals and each of said plurality of host systems;

said resource server further including a plurality of forms to be completed, said plurality of forms to be completed each including a plurality of uncompleted fields;

said resource server also including a dynamic forms manager and coordinator, responsive to at least a selected first one of said programmable data processing function selectors, for dynamically retrieving at least a first datum contained in at least one data field displayed on said data terminal display screen at a predetermined data terminal screen coordinate position indicated by said selected first one of said programmable data processing function selectors, and for retrieving at least a second datum displayed on said data terminal display screen at a pre-determined data terminal screen coordinate position, said forms manager and coordinator for dynamically inserting said at least first and second retrieved datum into at least a selected first and second of said uncompleted fields of said at least one form indicated by said selected first one of said programmable data processing function selectors, for at least partially completing said at least one form; and said forms manager and coordinator responsive to a selected second one of said programmable data processing function selectors of said at least one operator terminal, for storing said at least partially completed form in said resource server for subsequent access by any one of said plurality of operator terminals.

2. A data processing system including a database and data structure independent forms manager and coordinator, said data processing system comprising:

at least one operator terminal, said at least one operator terminal including at least a data terminal display screen and a plurality of programmable data processing function selectors, said at least one operator terminal for initiating at least a first computer applications program and for displaying on said data terminal display screen data obtained from at least a first and a second data source said data obtained from said at least first and second data sources displayed at predetermined data terminal display screen coordinate positions;

said data processing system including at least one form to be completed, said at least one form to be completed having a plurality of uncompleted data fields; and said data processing system further including a forms manager and coordinator, responsive to at least a first one of said plurality of programmable data processing function selectors, for at least retrieving at least a first datum displayed on said data terminal display screen at a predetermined data terminal screen coordinate position and obtained from said at least a first data source, said forms manager and coordinator for retrieving at least a second datum displayed on said data terminal display screen at a pre-determined data terminal screen coordinate position and obtained from said second data source, and for inserting said retrieved datum into at least one of said uncompleted fields of said at least one form to be completed and which is indicated by said selected first one of said plurality of programmable data processing function selectors, for at least partially completing said at least one retrieved form.

3. The system of claim 2 further including a plurality of operator terminals.

4. The system of claim 2 wherein said at least one operator terminal simultaneously displays a plurality of computer sessions.

5. The system of claim 2 wherein said data processing system includes a plurality of forms, each form having a plurality of uncompleted fields.

6. The system of claim 5 wherein said forms manager and coordinator is responsive to said selection of one of said data processing function selectors, for selecting at least one form from among said plurality of forms into which said retrieved data is to be inserted.

7. The system of claim 2 wherein said at least one operator terminal includes memory, for storing data displayed on said data terminal screen; and wherein said forms manager and coordinator retrieves data from at least one predetermined memory location associated with said predetermined data terminal screen coordinate position.

8. The system of claim 7 wherein said forms manager and coordinator stores said at least partially completed form to said memory of said at least one operator terminal.

9. The system of claim 2 wherein said forms manager and coordinator stores said at least partially completed form to a disk drive coupled to said data processing system.

10. The system of claim 2 wherein said forms manager and coordinator is responsive a selected one of said data processing function selectors, for printing said at least partially completed form on a printer coupled to said data processing system.

11. The system of claim 2 wherein said data processing system further includes at least one host system; and wherein said at least one host system includes said at least one database and executes said at least one applications program.

12. The system of claim 11 wherein said at least one host system includes and executes a plurality of application programs; and wherein said at least one operator terminal display screen simultaneously displays a corresponding plurality of computer sessions.

13. The system of claim 11 wherein said data processing system further includes a plurality of said host systems.

14. The system of claim 2 wherein said data processing system is further responsive to at least a selected second one of said programmable data processing function selectors and to at least one datum contained in at least one data field displayed on said data terminal display screen at a predetermined data terminal screen coordinate position, for automatically initiating at least a second computer applications program to access at least a second database, for retrieving at least a second predetermined computer session, and for retrieving datum contained in at least one predetermined data field of said second predetermined computer session, said at least one predetermined data field indicated by said selected second one of said plurality of programmable data processing function selectors, and for inserting said retrieved datum into at least a selected one of said uncompleted fields of said at least one form, for at least further partially completing said at least one form.

15. The system of claim 2 wherein said plurality of data processing function selectors includes a plurality of preselected data terminal keyboard keys.

16. The system of claim 2 wherein at least one of said plurality of data processing function selectors includes a telephone signal receiving unit.

17. The data processing system of claim 2, wherein said forms manager and coordinator is responsive to a selected second one of said data processing function selectors of said at least one operator terminal, for storing said at least partially completed form in said data processing system.

18. The data processing system of claim 2 wherein said at least a first data source includes at least a first database.

19. The data processing system of claim 2 wherein said at least a second data source includes at least a second database.

20. The system of claim 19 wherein said data processing system is further responsive to at least a selected second one of said programmable data processing function selectors and to at least one datum contained in at least one data field displayed on said data terminal display screen at a predetermined data terminal screen coordinate position, for automatically initiating at least a second computer applications program to access at least a second database, and for retrieving and displaying on said data terminal display screen at least a second predetermined computer session.

21. The data processing system of claim 2 wherein said at least a first and second data sources are selected from the group consisting of: a first database, a second database, called party input, operator input, and data from at least a second computer applications program.

* * * * *